United States Patent [19]

Uchikawa et al.

[11] 4,352,853
[45] Oct. 5, 1982

[54] SOUND ABSORBER

[75] Inventors: Fusaoki Uchikawa, Kamakura; Hideharu Tanaka; Mutsuo Sekiya, both of Amagasaki; Yasufumi Ohata, Tokyo, all of Japan

[73] Assignee: Mitsubishi Denki Kabushiki Kaisha, Tokyo, Japan

[21] Appl. No.: 300,552

[22] Filed: Sep. 9, 1981

[30] Foreign Application Priority Data

Mar. 17, 1981 [JP]  Japan ................................. 56-41387
Mar. 17, 1981 [JP]  Japan ................................. 56-41389
Mar. 17, 1981 [JP]  Japan ................................. 56-41390
Mar. 24, 1981 [JP]  Japan ................................. 56-43456

[51] Int. Cl.³ ............................................. B32B 5/16
[52] U.S. Cl. ................................. 428/304.4; 181/204; 428/36; 428/317.9; 428/320.2; 428/328; 428/329
[58] Field of Search ................... 428/36, 304.4, 317.9, 428/320.2, 328, 329, 330; 181/175, 204

[56] References Cited

U.S. PATENT DOCUMENTS 4,264,660  4/1981  Siebels .................................. 428/329

Primary Examiner—William J. Van Balen
Attorney, Agent, or Firm—Oblon, Fisher, Spivak, McClelland & Maier

[57] ABSTRACT

A sound absorber comprises a layer of a composition of a heat resistant binder and an acidic solid catalyst which is coated on a porous metal substrate in the hardened form.

14 Claims, 7 Drawing Figures

SOUND ABSORBER

BACKGROUND OF THE INVENTION

1. Field of the Invention

The present invention relates to a sound absorber which can be used in a muffler for an internal-combustion engine.

2. Description of the Prior Art

It has been known to use a glass wool, a porous ceramic board and a porous metal board as a sound absorber used in a muffler for an internal-combustion engine. When these boards are used as the sound absorber, a tar or a soot as a combustion residue of gasoline is adhered on the surface of the board to cause clogging for a relatively short time during the operation of an internal-combustion engine whereby the sound absorption characteristic is lowered and the noise is increased.

When the glass wool or the porous ceramic is used as a sound absorber in a muffler for an internal-combustion engine, a flow speed of an exhaust gas is usually fast and a vibration is usually high whereby the sound absorber may be pulverized or damaged and can not be practically used.

The exhaust gas in the muffler is usually at a high temperature as about 400° to 800° C. and contains corrosive sulfur oxides and nitrogen oxides. Therefore, when the porous metal substrate is used in the muffler, serious corrosion is caused by the oxidation at high temperature and the clogging is caused by the corrosion product or the base of the porous metal substrate is corroded to be diminished and it can not be practically used except using a special heat resistant alloy for the porous metal substrate. Moreover, as the fundamental property of the porous metal substrate, pore diameters are relatively large and a porous metal substrate having excellent sound absorption characteristic is not easily obtained. These conventional products could not be practically used in the muffler for the internal combustion engine.

SUMMARY OF THE INVENTION

It is an object of the present invention to overcome the disadvantages of the conventional sound absorbers and to provide a sound absorber used in a muffler which has excellent sound absorption characteristic caused by clogging with tar and soot and is resistant to the oxidation at high temperature.

The foregoing and other objects of the present invention have been attained by providing a sound absorber which comprises a layer of a composition of a heat resistant binder and an acidic solid catalyst, if necessary, with a reducing agent, an alkaline solid catalyst or a low temperature oxidizing catalyst in the hardened form which is coated on a porous metal substrate.

DETAILED DESCRIPTION OF THE PREFERRED EMBODIMENTS

Figure 1:
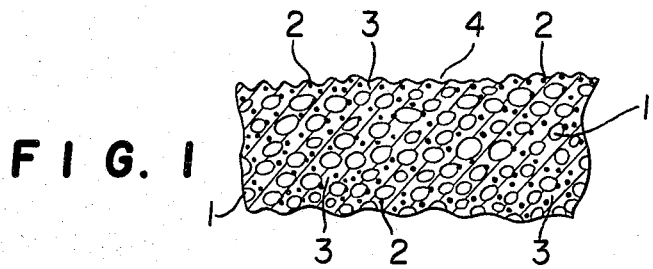
FIG. 1 shows the sound absorber of the present invention.

In the sound absorber of the present invention, a porous metal substrate which is not pulverized or damaged, is used as the sound absorbing substrate and a composition of the heat resistant layer and the acidic solid catalyst if necessary, with the reducing agent, the alkaline solid catalyst or the low temperature oxidizing catalyst in the hardened form is coated on the porous metal sound absorbing substrate for the three purposes of the prevention of the clogging with the tar or the soot; the improvement of the sound absorption characteristic and the prevention of corrosion deterioration caused by the oxidation at high temperature.

The sound absorber has the layer of the composition of the heat resistant binder and the acidic solid catalyst if necessary, with the reducing agent, the alkaline solid catalyst or the low temperature oxidizing catalyst formed on the porous metal substrated.

The acidic solid catalyst can be at least one of natural zeolite, activated clay, silica-zirconia, silica-magnesia, activated alumina, silica-alumina, vanadium pentoxide, alumina-boron oxide, zeolite, synthetic zeolite, and acid clay.

The reducing agent can be at least one of metallic powders, carbon powder, sulfites, ferrous salts and stannous salts which are thermally stable.

The alkaline solid catalyst can be at least one of potassium silicate, sodium aluminate, sodium silicate, lithium silicate, sodium carbonate and alkali metal oxides.

The low temperature oxidizing catalyst can be at least one of an oxide of Mn, Cu, Ni, Co, Mo, Cr, Fe, Ag, Zn, Pb, W or V or a complex oxide thereof or a metal of Pt, Pd, Rh, Ru, Ag or Au.

A content of the acidic solid catalyst in the coated layer is in a range of 5 to 85 wt.% preferably 20 to 60 wt.%. A content of the lower temperature oxidizing catalyst, the reducing agent and/or the alkaline solid catalyst is up to 50 wt.%.

The coated layer has a matrix made of at least one of porcelain enamel, glass frit, an alkali metal silicate, colloidal silica, colloidal alumina, a metal phosphate, a cement or a silicone resin (varnish).

The porous metal substrate can be made of at least one of iron, nickel or chromium as a main component.

The coated layer is preferably porous and is preferably formed on one surface of the porous metal substrate.

It is especially preferable to have the coated layer made of a matrix of silicone resin and manganese oxide powder and the porous metal substrate made of iron, nickel and/or chromium which is prepared by a powdery metallurgy.

The porous metal substrate preferably has a thickness of 2 to 10 mm and a porosity of 40 to 95%.

The coated layer preferably has a thickness of 10 to 80 $\mu$m and a specific surface area of 50 to 500 m$^2$/g.

The present invention will be illustrated by certain examples and references which are provided for purposes of illustration only and are not intended to be limiting the present invention.

EXAMPLE 1

A porous metal substrate made of aluminum by a powder metallurgy having a thickness of 5 mm (manufactured by Nippon Dia Clevite K.K.) was used as a metallic porous sound absorbing substrate. A mixture obtained by mixing the components of the Composition No. 1 by a ball mill for about 30 minutes, was sprayed to uniformly coat it on the porous metal board. The coated layer was dried at 80° C. for 30 minutes and baked at 550° C. for 30 minutes to form a hard layer. In the coating of the mixture, if the coated layer is too thick, the sound absorption characteristic is too low.

| Composition No. 1: | |
|---|---|
| Acidic solid catalyst: | |
| Natural zeolite: | 80 wt. parts |
| Binder: | |
| Aluminum phosphate: | 40 wt. parts |
| Additives: | |
| Silica, bentonite, water: | 60 wt. parts |

The additives improve coating property and characteristics of the coated layer and increase the strength of the coated layer and the adhesion on the porous metal substrate and form a porous coated layer.

The sound absorber of the present invention has the structure shown by a partially enlarged sectional view in FIG. 1 wherein the reference (1) designates particles of the porous metal substrate; the reference (2) designates particles of the acidic solid catalyst; and (3) designates a hardened heat resistant binder in which the particles of the acidic solid catalyst (3) are dispersed and which is placed in the pores between the particles of the porous metal substrate; and (4) designates a porous coated layer formed by coating the composition of the acidic solid catalyst particles (2) and the binder (3) on the surface of the substrate.

The characteristics of the sound absorber were tested in comparison with the porous metal board on which the Composition No. 1 was not coated.

Figure 2:
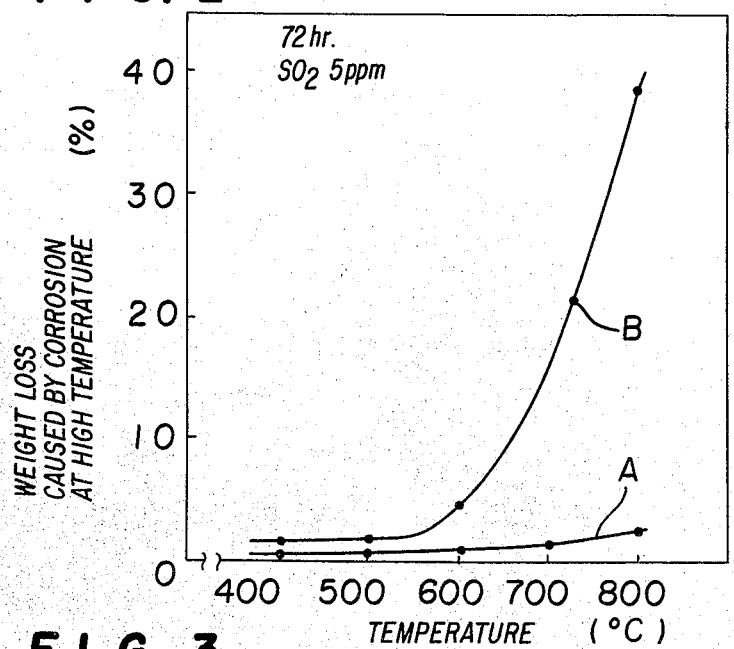
FIG. 2 shows weight losses caused by corrosion.

FIG. 2 shows weight losses caused by corrosion under maintaining the sample in air containing 5 ppm of $SO_2$ in an electric furnace at 400° to 800° C. The curve (A) shows the weight loss of the sound absorber of the present invention obtained by the process and the curve (B) shows the weight loss of the sound absorber of the porous metal substrate. As it is clearly found in FIG. 2, the sound absorber of the present invention had excellent corrosion resistance without a substantial corrosion in the air containing $SO_2$ at 400° to 800° C. which is the temperature of a combustion gas in a muffler of an internal-combustion engine. On the other hand, the conventional porous metal board was corroded to give a remarkable weight loss depending upon the rising of the temperature to cause serious weight loss from a temperature of 600° C. which is near a melting point of 600° C. because of an oxidation at high temperature. This was substantially caused by a melting and a vaporization of aluminum. The formation of a corrosion product having white (scale) was observed on the surface.

Figure 3:
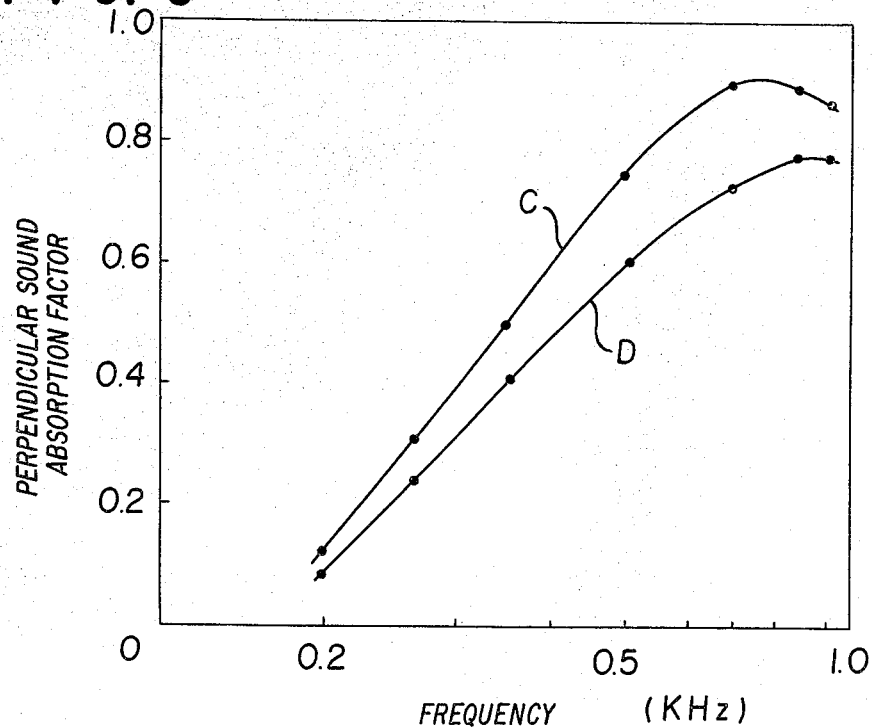
FIG. 3 shows normal incident sound absorption.

FIG. 3 shows a normal incident sound absorption efficiency measured pursuant to Japanese Industrial Standard A-1405 (Standing wave method). The curve (C) shows the characteristic of the sound absorber of the present invention and the curve (D) shows the characteristic of the sound absorber of the porous metal board. As it is clearly found in FIG. 3, the sound absorber of the present invention had remarkably higher sound absorption coefficient than that of the porous metal substrate.

The product having the structure shown in Figure prepared by coating and baking the Composition No. 1 on the surface of the porous metal substrate has a substantially porous structure and accordingly air can internally flow. That is, the baked, coated layer of the Composition No. 1 forms a part of the sound absorber. The sound absorption coefficient can be controlled by the coating method.

Figure 4:
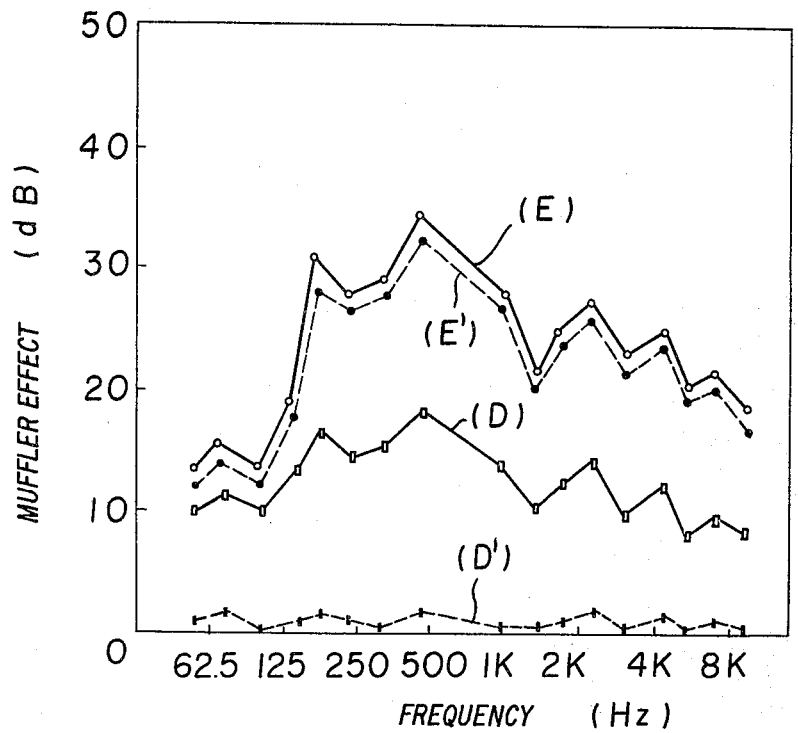
FIGS. 4 and 5 shows characteristics of muffler effects in comparison with initial muffler effects.

Each of the sound absorbing substrates was formed in a cylindrical form and was fitted in a muffler of a car (piston displacement of 1,800 cc) and tested by driving about 10,000 km. and the muffler effect was measured pursuant to Japanese Industrial Standard D 1616. FIG. 4 shows the characteristics of muffler effects in comparison with the initial muffler effects. The curves (E) and (E') respectively show characteristics of the sound absorber of the present invention at the initiation and after driving. The curves (F) and (F') respectively show characteristics of the sound absorber of the porous metal substrate at the initiation and after driving. As it is clearly found from FIG. 4, the initial muffler effect was excellent and the muffler effect was not substantially reduced after driving for 10,000 km. in the case of the use of the sound absorber of the present invention. On the other hand, the muffler effect was remarkably reduced in all of the measured frequency bands after driving for 10,000 km. in the case of the use of the porous metal substrate as the sound absorber. After the measurements of the muffler effect, both the sound absorbers were taken out and observed. The sound absorber of the present invention was substantially clean as the initial. On the contrary, the sound absorber of the porous metal substrate caused serious clogging by an adhesion of a large amount of a corroded product and a black tar and soot as combustion residues on the surface of the sound absorber. As it is found from the result, the acidic solid catalyst particles dispersed in the sound absorber of the present invention are activated at the temperature of the combustion gas whereby the oxidized polymerization of the adhered tar components of the combustion gas on the surface of the sound absorber is prevented and the tar components are decomposed to be low molecular weight and to be easily vaporized. Thus, the tar components are not adhered as a tar but spontaneously vaporized at the temperature of the combustion gas to be clean. Therefore, the initial muffler effect may be maintained.

The acidic solid catalyst emits protons ($H^+$) or accepts paired electrons. The aforementioned catalytic function is known as the cracking of a catalytic decomposition of a heavy oil into a low boiling light oil with a low boiling point.

EXAMPLE 2

A powder-sintered metal board made of gun metal having a thickness of 5 mm was used as a metallic porous sound absorbing substrate. Each mixture having Composition 2 or 3 was kneaded and sprayed to coat it on the metallic porous substrate and baked it to form a hardened layer by the process of Example 1. The sound abosrber of the present invention was obtained.

| Composition No. 2: | |
|---|---|
| Acidic solid catalyst: | |
| Activated clay: | 80 wt. parts |
| Binder: | |
| Silicone resin: | 30 wt. parts |
| Additives: | |
| Magnesium oxide and thinner: | 60 wt. parts |
| Composition No. 3: | |
| Acidic solid catalyst: | |
| Silica-zirconia: | 30 wt. parts |

| -continued | |
|---|---|
| Silica-magnesia: | 30 wt. parts |
| Binder: | |
| Sodium silicate: | 40 wt. parts |
| Additive: | |
| Alumina, calcium carbonate and water: | 60 wt. parts |

EXAMPLE 3

In accordance with the process of Example 1 except using a foamed metal board made of nickel having a thickness of 5 mm (Cellmet manufactured by Sumitomo Elect. Ind.) as a metallic porous sound absorbing substrate and spraying a mixture having Composition No. 4, a sound absorber of the present invention was obtained and a test for muffler effect was performed.

| Composition No. 4: | |
|---|---|
| Low temperature oxidizing catalyst: | |
| Iron oxide: | 15 wt. parts |
| Copper oxide: | 20 wt. parts |
| Acidic solid catalyst: | |
| Activated clay: | 20 wt. parts |
| Binder: | |
| Aluminum phosphate: | 30 wt. parts |
| Phosphoric acid frit: | 15 wt. parts |
| Additives: | |
| Alumina, silicate, water: | 60 wt. parts |

Figure 5:
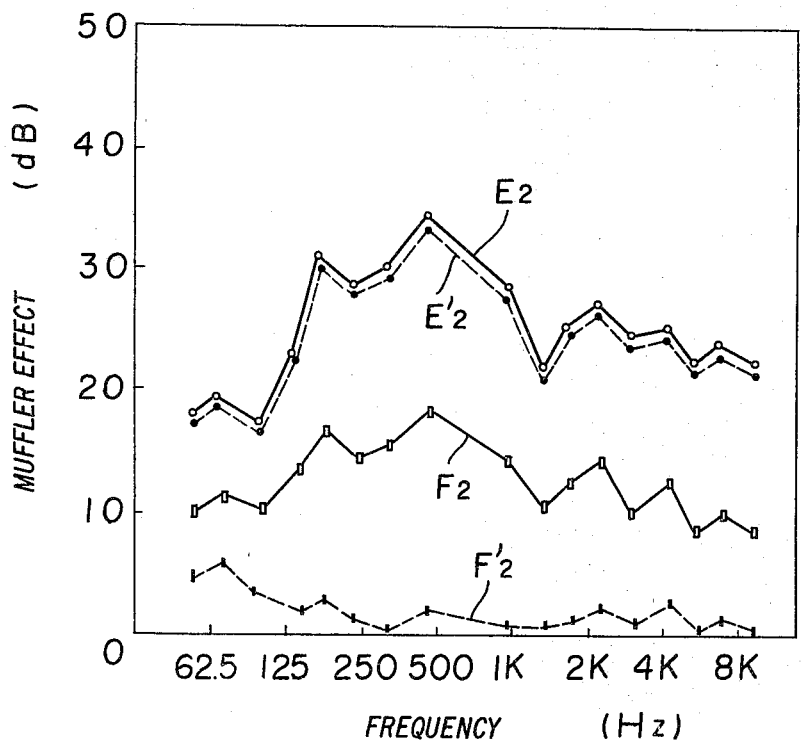

FIG. 5 shows the characteristics of muffler effects in comparison with the initial muffler effects. The curves ($E_2$) and ($E'_2$) respectively show characteristics of the sound absorber of the present invention at the initiation and after driving. The curves ($F_2$) and ($F'_2$) respectively show characteristics of the sound absorber of the porous metal substrate at the initiation and after driving. As it is clearly found from FIG. 5, the initial muffler effect was excellent and the muffler effect was not substantially reduced after driving for 10,000 km. in the case of the use of the sound absorber of the present invention.

EXAMPLE 4

In accordance with the process of Example 2 except using a powder-sintered metal board made of gun metal having a thickness of 5 mm was used as a metallic porous sound absorbing substrate and spraying each mixture having Composition No. 5 or 6 each sound absorber of the present invention was obtained and a test for muffler effect was performed.

The results are substantially the same as Example 3.

| Composition No. 5: | |
|---|---|
| Low temperature oxidizing catalyst: | |
| Manganese dioxide: | 30 wt. parts |
| Acidic solid catalyst: | |
| Natural zeolite: | 30 wt. parts |
| Binder: | |
| Methyl phenyl silicone: | 40 wt. parts |
| Additives: | |
| Alumina, organic modified bentonite thinner: | 50 wt. parts |
| Composition No. 6: | |
| Low temperature oxidizing catalyst: | |
| Nickel oxide: | 25 wt. parts |
| Cobalt oxide: | 10 wt. parts |
| Acidic solid catalyst: | |
| Silica-magnesia: | 15 wt. parts |
| Silica-zirconia: | 15 wt. parts |

| -continued | |
|---|---|
| Binder: | |
| Sodium silicate: | 30 wt. parts |
| Calcium phosphate: | 15 wt. parts |
| Additive: | |
| Alumina, magnesium carbonate water: | 60 wt. parts |

EXAMPLE 5

In accordance with the process of Example 1 except spraying a mixture having Composition No. 7, a sound absorber of the present invention was obtained and a test for muffler effect was performed.

| Composition No. 7: | |
|---|---|
| Acidic solid catalyst: | |
| Natural zeolite: | 20 wt. parts |
| Reducing agent: | |
| Silver powder: | 20 wt. parts |
| Binder: | |
| Aluminum phosphate: | 20 wt. parts |
| Calcium phosphate: | 25 wt. parts |
| Additive: | |
| Silica, alumina, water: | 60 wt. parts |

Figure 6:
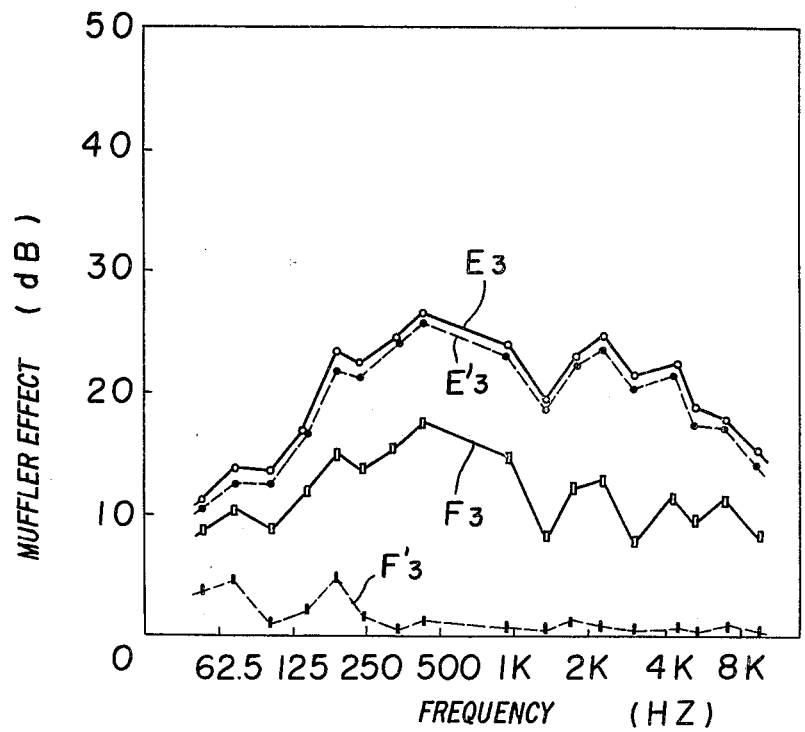

FIG. 6 shows the characteristics of muffler effects in comparison with the initial muffler effects. The curves ($E_3$) and ($E'_3$) respectively show characteristics of the sound absorber of the present invention at the initiation and after driving. The curves ($F_3$) and ($F'_3$) respectively show characteristics of the sound absorber of the porous metal substrate at the initiation and after driving. As it is clearly found from FIG. 6, the initial muffler effect was excellent and the mffler effect was not substantially reduced after driving for 10,000 km. in the case of the use of the sound absorber of the present invention.

EXAMPLE 6

In accordance with the process of Example 2 except using a powder-sintered metal board made of gun metal having a thickness of 5 mm was used as a metallic porous sound absorbing substrate and spraying each mixture having Composition 8 or 9 each sound absorber of the present invention was obtained and a test for muffler effect was performed.

The results are substantially the same as Example 5.

| Composition No. 8: | |
|---|---|
| Acidic solid catalyst: | |
| Activated clay: | 20 wt. parts |
| Reducing agent: | |
| Sodium sulfite: | 15 wt. parts |
| Ferrous sulfate: | 15 wt. parts |
| Binder: | |
| Methyl phenyl silicone: | 40 wt. parts |
| Additive: | |
| Alumina, organic modified bentonite thinner: | 70 wt. parts |
| Composition No. 9: | |
| Acidic solid catalyst: | |
| Silica-zirconia: | 15 wt. parts |
| Silica-magnesia: | 15 wt. parts |
| Reducing agent: | |
| Stannous nitrate: | 25 wt. parts |
| Binder: | |
| Aluminum powder containing sodium silicate: | 45 wt. parts |
| Additive: | |

| -continued | |
|---|---|
| Silica, magnesium carbonate, water: | 60 wt. parts |

EXAMPLE 7

In accordance with the process of Example 1 except spraying a mixture having Composition 4, a sound absorber of the present invention was obtained and a test for muffler effect was performed.

| Composition No. 10: | |
|---|---|
| Low temperature oxidizing catalyst: | |
| Chromium oxide: | 10 wt. parts |
| Nickel oxide: | 10 wt. parts |
| Acidic solid catalyst: | |
| Acidic clay: | 20 wt. parts |
| Reducing agent: | |
| Silver powder: | 15 wt. parts |
| Alkaline material: | |
| Sodium silicate: | 15 wt. parts |
| Binder: | |
| Methyl phenyl silicone: | 50 wt. parts |
| Alumina cement: | 5 wt. parts |
| Additive: | |
| Silicate, bentonite, thinner: | 80 wt. parts |

Figure 7:
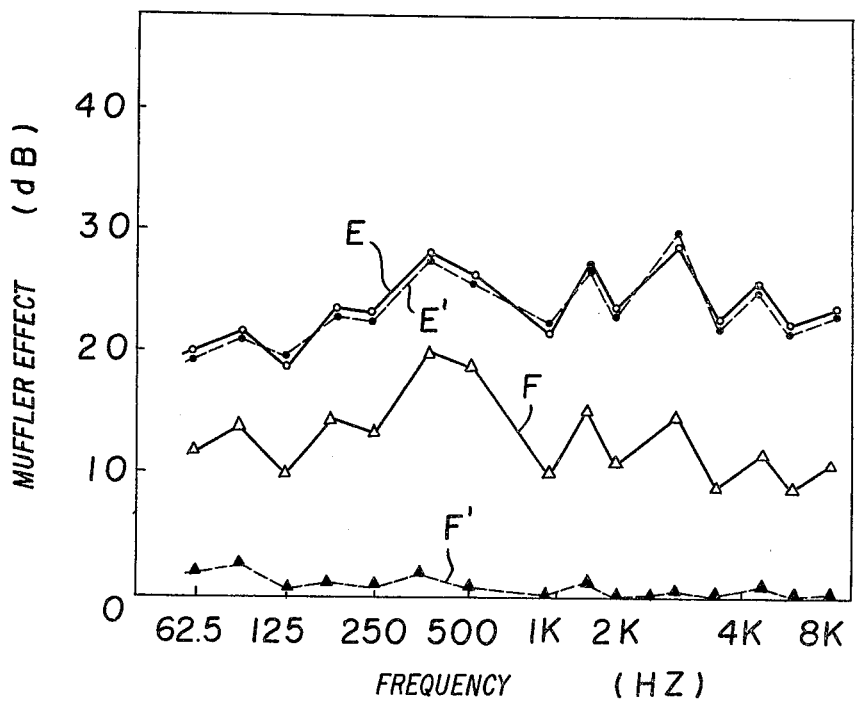

FIG. 7 shows the characteristics of muffler effects in comparison with the initial muffler effects. The curves ($E_4$) and ($E'_4$) respectively show characteristics of the sound absorber of the present invention at the initiation and after driving. The curves ($F_4$) and ($F'_4$) respectively show characteristics of the sound absorber of the porous metal substrate at the initiation and after driving. As it is clearly found from FIG. 7, the initial muffler effect was excellent and the muffler effect was not substantially reduced after driving for 10,000 km. in the case of the use of the sound absorber of the present invention.

EXAMPLE 8

In accordance with the process of Example 1 except coating each mixture having Composition 11 or 12 by a brushing each sound absorber of the present invention was obtained and a test for muffler effect was performed.

The results are substantially the same as Example 7.

| Composition No. 11: | |
|---|---|
| Low temperature oxidizing catalyst: | |
| Iron oxide: | 10 wt. parts |
| Chromium oxide: | 10 wt. parts |
| Acidic solid catalyst: | |
| Silica-zirconia: | 10 wt. parts |
| Silica-magnesia: | 10 wt. parts |
| Reducing agent: | |
| Ferrous sulfate: | 10 wt. parts |
| Stannous sulfate: | 10 wt. parts |
| Binder: | |
| Aluminum phosphate: | 60 wt. parts |
| Additives: | |
| Alumina, bentonite, water: | 80 wt. parts |
| Composition No. 12: | |
| Low temperature oxidizing catalyst: | |
| Manganese dioxide: | 20 wt. parts |
| Acidic solid catalyst: | |
| Zeolite: | 20 wt. parts |
| Alkaline catalyst: | |
| Sodium aluminate: | 15 wt. parts |
| Sodium carbonate: | 5 wt. parts |
| Binder: | |

| -continued | |
|---|---|
| Sodium silicate: | 25 wt. parts |
| Alumina cement: | 35 wt. parts |
| Additives: | |
| Calcium oxide, water: | 85 wt. parts |

In accordance with the test methods of Example 1, the characteristics of the resulting sound absorbers and the metallic porous sound absorbing substrate having no coating of Composition 2 or 3.

As a result, the sound absorbers having the coated hard layer made of Composition 2 or 3 of the present invention had excellent characteristics of the corrosion resistance, the sound absorption factor, and the prevention of clogging for time change of muffler effect, the same as those characteristics shown in FIGS. 2 to 4.

The low temperature oxidizing catalysts used in the present invention can be the catalysts used in Compositions 1, 2 or 3 and also metal oxides such as $CoO$, $Co_3O_4$, $Cr_2O_3$, $Fe_2O_3$, $Ag_2O$, $ZnO$ and $PbO$, and complex metal oxides such as $NiCr_2O_4$, $MnCr_2O_4$, $CuCr_2O_4$ and $MnFe_2O_4$ and powders or fine powders of noble metals such as Pt, Pd, Rh, Ru and Ag which have the oxidizing catalytic activity and heat resistance. It is possible to use two or more kinds of the catalysts.

The porous metal substrates used as the substrate in the present invention can be foamed metal substrates and sintered powder metal substrates used in Examples and also commercially available substrates such as metallic fibers and inorganic fiber reinforced metal. The substrates can be made of nickel, bronze, aluminum and alloys such as Fe-Cr, Fe-Ni-Cr and Fe-Cr-Al.

The heat resistant binders used in the present invention can be porcelain enamel (glass frit), alkali metal silicates, colloidal silica, colloidal alumina, metal phosphates, cements, silicone resins (varnish) and mixtures thereof.

The sound absorber of the present invention is used as a sound absorber for a muffler for an internal combustion engine and can be also used as a sound absorber for the other apparatuses such as combustion devices.

As described, in accordance with the sound absorber of the present invention, the composition of the heat resistant binder and the low temperature oxidizing catalyst is coated in the hardened form, on the porous metal substrate. Therefore, the sound absorber has excellent sound absorption characteristic, excellent high temperature oxidation resistance and excellent corrosion resistance. When the sound absorber is used as the sound absorber in the muffler for the internal-combustion engine, the deterioration of the muffler effect caused by the clogging with a tar or a soot is prevented and the muffler effect at the initiation can be maintained. Therefore, the sound absorber has excellent characteristic for a long time and can be used in mufflers for internal-combustion engines of cars, etc.

We claim:

1. A sound absorber which comprises a layer of a composition of a heat resistant binder and an acidic solid catalyst which is coated on a porous metal substrate in the hardened form.

2. The sound absorber according to claim 1 wherein said layer of a composition comprises a heat resistant binder, an acidic solid catalyst and a low temperature oxidizing catalyst.

3. The sound absorber according to claim 1 wherein said layer of a composition comprises a heat resistant binder, an acidic solid catalyst and a reducing agent.

4. The sound absorber according to claim 1 wherein said layer of a composition comprises a heat resistant binder, an acidic solid catalyst, a lower temperature oxidizing catalyst and a reducing agent or an alkaline solid catalyst.

5. The sound absorber according to claim 1 wherein the acidic solid catalyst is at least one of natural zeolite, activated clay, silica-zirconia, silica-magnesia, activated alumina, silica-alumina, vanadium pentoxide, alumina-boron oxide, zeolite, synthetic zeolite, and acid clay.

6. The sound abosrber according to claim 1 wherein said low temperature oxidizing catalyst is made of at least one of an oxide on Mn, Cu, Ni, Co, Mo, Cr, Fe, Ag, Zn, Pb, W or V or a complex oxide thereof or a metal of Pt, Pd, Rh, Ru, Ag or Au.

7. The sound absorber according to claim 1 wherein said coated layer has a binder in the form of a matrix made of at least one of porcelain enamel, glass frit, an alkali metal silicate, colloidal silica, colloidal alumina, a metal phosphate, a cement or a silicone resin (varnish).

8. The sound absorber according to claim 1 wherein said porous metal substrate is made of at least one of iron, nickel or chromium as a main component.

9. The sound absorber according to claim 1, 2, 3 or 4 wherein said coated layer is a porous layer.

10. The sound absorber according to claim 1 or 5 wherein said coated layer is formed on only one surface of said porous metal substrate.

11. The sound absorber according to claim 1 which is used in an exhaust system of an internal-combustion engine or a combustion device.

12. The sound absorber according to claim 1 wherein said coated layer has a matrix of a silicone resin and manganese oxide powder and said porous metal substrate is made of iron, nickel and/or chromium which is prepared by a powdery metallurgy.

13. The sound absorber according to claim 3 wherein the reducing agent is at least one of metallic powders, carbon powder, sulfites, ferrous salts and stannous salts which are thermally stable.

14. The sound absorber according to claim 3 wherein the alkaline solid catalyst is at least one of potassium silicate, sodium aluminate, sodium silicate, lithium silicate, sodium carbonate and alkali metal oxides.

* * * * *